(12) United States Patent
Sarkar et al.

(10) Patent No.: US 10,723,856 B2
(45) Date of Patent: Jul. 28, 2020

(54) ETCHANT FOR USE IN RAPID FORMATION OF ROBUST POROUS POLYMERS

(71) Applicant: University of South Carolina, Columbia, SC (US)

(72) Inventors: Amrita Sarkar, Columbia, SC (US); Morgan Stefik, Columbia, SC (US); Chuanbing Tang, Columbia, SC (US)

(73) Assignee: University of South Carolina, Columbia, SC (US)

( * ) Notice: Subject to any disclaimer, the term of this patent is extended or adjusted under 35 U.S.C. 154(b) by 226 days.

(21) Appl. No.: 15/846,313

(22) Filed: Dec. 19, 2017

(65) Prior Publication Data
US 2018/0171091 A1 Jun. 21, 2018

Related U.S. Application Data

(60) Provisional application No. 62/436,739, filed on Dec. 20, 2016.

(51) Int. Cl.
*C08J 9/26* (2006.01)
*C08J 7/14* (2006.01)

(52) U.S. Cl.
CPC . *C08J 9/26* (2013.01); *C08J 7/14* (2013.01); C08J 2201/0464 (2013.01); C08J 2325/06 (2013.01); C08J 2353/00 (2013.01)

(58) Field of Classification Search
CPC ........ C08J 7/14; C08J 9/26; C08J 2201/0464; C08J 2325/06; C08J 2353/00
See application file for complete search history.

(56) References Cited

U.S. PATENT DOCUMENTS

| | | | | |
|---|---|---|---|---|
| 2011/0076416 A1* | 3/2011 | Klipp | ..................... | C08G 77/06 427/487 |
| 2018/0164683 A1* | 6/2018 | Fujiwara | ................. | G03F 7/039 |

OTHER PUBLICATIONS

Bailey, et al. "Routes to Alkene and Epoxide Functionalized Nanoporous Materials from Poly(styrene-b-isoprene-b-lactide) Triblock Copolymers," *Macromolecules* 2006, 39, pp. 8772-8781.
Baruth, et al. "Optimization of Long-Range Order in Solvent Vapor Annealed Poly(styrene)-block-poly(lactide) Thin Films for Nanolithography," *ACS Appl. Mater. Interfaces* 2014, 6, pp. 13770-11781.
Bates, et al. *Phys. Today* 1999, 52, pp. 32-38.
Chen, et al. "Mechanically and Thermally Robust Ordered Nanoporous Monoliths Using Norbornene-Functional Block Polymers," *Macromolecules* 2009, 42, pp. 4237-4243.
Cleland, et al. "Emerging protein delivery methods," *Curr. Opin. Biotechnol.* 2001, 12, pp. 212-219.
Crossland, et al. "Freestanding nanowire arrays from soft-etch block copolymer templates," *Soft Matter* 2007, 3, pp. 94-98.

Crossland, et al. "A Bicontinuous Double Gyroid Hybrid Solar Cell," *Nano Lett.* 2009, 9, pp. 2807-2812.
Crossland, et al. "Block Copolymer Morphologies in Dye-Sensitized Solar Cells: Probing the Photovoltaic Structure-Function Relation," *Nano Lett.* 2009, 9, pp. 2813-2819.
Crossland, et al. "In situ Electrochemical Monitoring of Selective Etching in Ordered Mesoporous Block-Copolymer Templates," *ACS Appl. Mater. Interfaces* 2011, 3, pp. 1375-1379.
Cummins, et al. "Selective Etching of Polylactic Acid in Poly(styrene)-Block-Poly$_{(D,L)}$Lactide Diblock Copolymer for Nanoscale Patterning," *Journal of Appl. Polym. Sci.* 2014, 131, pp. 40798-40810.
Cummins, et al. "Solvothermal Vapor Annealing of Lamellar Poly(styrene)-blockpoly$_{(D,L)}$?actide) Block Copolymer Thin Films for Directed Self-Assembly Application," *ACS Appl. Mater. Interfaces* 2016, 8, pp. 8295-8304.
Grande, et al. "Functionalized ordered nanoporous polymeric materials: From the synthesis of diblock copolymers to their nanostructuration and their selective degradation," *Microporous and Mesoporous Materials* 2011, 140, pp. 34-39.
Hamley, I., "Nanotechnology with Soft Materials," *Nantechnology* 2003, 42, pp. 1692-1712.
Hillmyer, M. "Nanoporous Materials from Block Copolymer Precursors," *Adv. Polym. Sci.* 2005, 190, pp. 137-181.
Ho, et al. "Transfer of Chirality from Molecule to Phase in Self-Assembled Chiral Block Copolymers," *Journal of Am. Chem. Soc.* 2012, 134, pp. 10974-10986.
Hsueh, et al. "Nanoporous Gyroid Nickel from Block Copolymer Templates via Electroless Plating," *Adv. Mater.* 2011, 23, pp. 3041-3046.
Hsueh, et al. "Shifting Networks to Achieve Subgroup Symmetry Properties," *Adv. Mater.* 2014, 26, pp. 3225-3229.
Jackson, et al. "ABAC Tetrablock Terpolymers for Tough Nanoporous Filtration Membranes," *Macromolecules* 2013, 46, pp. 1484-1491.
Jacubowski, et al. "Polystyrene with Improved Chain-End Functionality and Higher Molecular Weight by ARGET ATRP," *Macromol. Chem. Phys.* 2008, 209, pp. 32-39.
Kamber, et al. "Organocatalytic Ring-Opening Polymerization," *Chem. Rev.* 2007, 107, pp. 5813-5840.
Karmore, et al. "Thermal Degradation of Polystyrene by Lewis Acids in Solution," *Ind. Eng. Chem. Res.* 2002, 41, pp. 657-660.
Lei, et al. "Long-Range-Ordered, Hexagonally Packed Nanoporous Membranes from Degradable-Block-Containing Diblock Copolymer Film Templates," *Journal of Appl. Polym. Sci.* 2014, 131, pp. 39638-39653.
Liu, et al. "Thin Films with Densely, Regularly Packed Nanochannels: Preparation, Characterization, and Applications," *Chem. Mater.* 1999, 11, pp. 2233-2240.

(Continued)

*Primary Examiner* — John M Cooney
(74) *Attorney, Agent, or Firm* — Dority & Manning, P.A.

(57) ABSTRACT

A trifluoroacetic acid-based etchant is described that can remove a sacrificial component of a multi-component polymer, e.g., a self-assembled block copolymer. The etchant can operate at a high etch rate and with excellent selectivity. The etchant can remove a hydrolysable sacrificial component such as a polylactide block from a self-assembled block copolymer. The etchant enables the macroscopic preservation of the nanostructure morphologies of self-assembled copolymers (e.g., poly(styrene-block-lactide) copolymers) and can yield pristine porous films of the non-hydrolysable component of the starting multi-component polymer.

13 Claims, 11 Drawing Sheets

(56) References Cited

OTHER PUBLICATIONS

Li, et al. "Block copolymer patterns and templates," *Materials Today* 2006, 9, pp. 30-39.
Li, S. "Hydrolytic Degradation Characteristics of Aliphatic Polyesters Derived from Lactic and Glycolic Acids," *Journal of Biomed. Mater. Res.* 1999, 48, pp. 342-353.
Lu, et al. "Aerosol-assisted self-assembly of mesostructured spherical nanoparticles," *Nature* 1999, 398, pp. 223-226.
Mao, et al. "Control of pore hydrophilicity in ordered nanoporous polystyrene using an AB/AC block copolymer blending strategy," *Faraday Discuss.* 2005, 128, pp. 149-162.
Oh, et al. "Photoinitiated Polymerization-Induced Microphase Separation for the Preparation of Nanoporous Polymer Films," *ACS Macro Letters* 2015, 4, pp. 1244-1248.
Pai, et al. "Mesoporous Silicates Prepared Using Preorganized Templates in Supercritical Fluids," *Science* 2004, 303, pp. 507-510.
Peinemann, et al., "Asymmetric superstructure formed in a block copolymer via phase separation," *Nat. Mater.* 2007, 6, pp. 992-996.
Rzayev, et al. "Nanochannel Array Plastics with Tailored Surface Chemistry," *Journal of Am. Chem. Soc.* 2005, 127, pp. 13373-13379.
Scherer, M., Thesis, University of Cambridge, 2012.
Tsuji, et al. "Properties and Morphology of Poly($_L$-lactide). II. Hydrolysis in Alkaline Solution," *Journal of Polymer Science: Part A: Polymer Chemistry* 1998, 36, pp. 59-66.
Ukei, et al. "Catalytic degradation of polystyrene into styrene and a design of recyclable polystyrene with dispersed catalysts," *Catalysis Today* 2000, 62, pp. 67-75.
Wang, et al. "Double and Single Network Phases in Polystyrene-blockpoly($_L$?actide) Diblock Copolymers," *Macromolecules*, 2013, 46, pp. 2997-3004.
Wang, et al. "A Facile Method To Fabricate Double Gyroid as a Polymer Template for Nanohybrids," *Macromolecules*, 2014, 47, pp. 7993-8001.
Wolf, et al. "Ordered Nanoporous Poly(cyclohexylethylene)," *Langmuir* 2003, 19, pp. 6553-6560.
Yang, et al. "Single-File Diffusion of Protein Drugs through Cylindrical Nanochannels," *ACS Nano* 2010, 4, pp. 3817-3822.
Zalusky, et al. "Mesoporous Polystyrene Monoliths," *Journal of Am. Chem. Soc.* 2001, 123, pp. 1519-1520.
Zalusky, et al. "Ordered Nanoporous Polymers from Polystyrene-Polylactide Block Copolymers," *Journal of Am. Chem. Soc.* 2002, 124, pp. 12761-12773.

\* cited by examiner

ETCHANT FOR USE IN RAPID FORMATION OF ROBUST POROUS POLYMERS

CROSS REFERENCE TO RELATED APPLICATION

This application claims filing benefit of U.S. Provisional Patent Application Ser. No. 62/436,739 having a filing date of Dec. 20, 2016, which is incorporated herein by reference for all purposes.

BACKGROUND

Porous materials derived from block copolymers are crucial for numerous applications including size selective separations such as ultrafiltration for water treatment, the controlled delivery of drugs, the templating of surface patterns, and the production of functional inorganic nanostructures. The self-assembly of block copolymers into ordered morphologies provides a scalable approach for the synthesis of ordered materials that include uniform, nanoscale pores and high specific surface areas that may be chemically functionalized.

The selective etching of a sacrificial block of a block copolymer is the most widespread method of producing such porous polymers. Despite numerous etching chemistries reported in the literature, there remain challenges in balancing the extent of an etch process against the preservation of the nanostructure. For example, a widely used alkaline etch route has been noted to damage the quality of thin-film pattern transfer after only 15 minutes of mild 0.05 M NaOH contact, limiting thin film pattern retention to films of less than 50 nm. The etching of thick polymer films is highly challenging as a high selectivity of the etchant is crucial in order to to limit the degradation of the retained block, while the thickness of the polymer films calls for long exposure times in order to etch across multiple grain boundaries, which increases the likelihood of nanostructure degradation. For instance, etching through a poly(styrene-block-lactide) (PS-b-PLA) film of no more than about 1 millimeter (mm) in thickness with 0.5 M NaOH typically requires about 3-5 days, corresponding to an average etch rate of 1 to 1.5 nanometers per second (nm/s). In another example, complete PLA removal from PS-b-PLA films of about 0.32 mm thickness required shear alignment of the morphology to reduce the grain boundary concentration and a 44 hr etch with 0.5 M NaOH. Such methodology is highly problematic.

The preservation of the chemical and structural integrity of the retained matrix is crucial for nanostructure retention through a complete etch process. Evidence for nanostructure retention over macroscopic regions is generally provided by use of an ensemble measurement such as small-angle X-ray scattering (SAXS) that can sample a few $mm^3$ to quantitatively confirm preserved lattice parameters over ~$10^{13}$ unit cells. NaOH-etched films have been known to exhibit a shift in the SAXS pattern. Such shifts of SAXS peak positions demonstrate a change to the scattering structure factor and are indicative of morphology shrinkage.

What are needed in the art are etchants and etching methodologies that can selectively remove the sacrificial block of polymeric thin films while retaining the nanostructure morphology of the film. Moreover, etchants that can etch thicker films (e.g., on the order of a few millimeters) quickly and with high selectivity for the sacrificial block and thereby successfully retain the porous nanostructure of the film would be beneficial in the art.

SUMMARY

According to one embodiment, disclosed is a trifluoroacetic acid-based etchant as may be utilized to selectively degrade sacrificial components of a multi-component polymer (e.g., a block copolymer or a polymer blend) in formation of a porous polymeric film. More specifically, the etchant can be an aqueous composition including trifluoroacetic acid and optionally a solvent or a mixture of solvents.

Also disclosed are methods for forming a porous polymeric structure by use of the trifluoroacetic acid-based etchant. For instance, a method can include contacting a structure, and specifically a multi-component polymer (e.g., a block copolymer) of the structure with the trifluoroacetic acid-based etchant for a period of time. Upon contact, a hydrolysable component of the multi-component polymer can be selectively degraded while a non-hydrolysable component can be unaffected. Accordingly, the contact can lead to formation of pores in the polymeric structure.

Beneficially, the disclosed etchants can exhibit high selectivity and high etch rate of the sacrificial blocks. As such, the disclosed etchants can enable the formation of thick porous films with relatively short etchant times (e.g., on the order of hours) that include highly preserved nanostructure morphologies.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to a trifluoroacetic acid etchant that can remove a sacrificial component of a multi-component polymer such as a self-assembled block copolymer, a polymer blend, or the like. The etchant can remove the sacrificial component at a high etch rate and with excellent selectivity. For instance, the etchant can demonstrate an etch rate of about 5 nm/s or greater, or about 10 nm/s or greater in some embodiments, for instance from about 10 nm/s to about 15 nm/s. The high etch rate can provide a route for the removal of a hydrolysable sacrificial component from a multi-component polymer in a fraction of the time required when using previously known alkaline etchants. For instance, a polymeric film of a thickness on the order of 2 millimeters can be completely etched in less than a day, for example in about 19 hours. Furthermore, the improved etch selectivity of the trifluoroacetic etchant enables the macroscopic preservation of the nanostructure morphologies of the starting multi-component polymers and can yield pristine porous films of the non-hydrolysable component of the starting materials.

The fast and highly selective etchants can support large-volume production of nanostructured materials for, e.g. catalytic applications. Moreover, the etchants can provide a route to formation of porous materials having geometries not previously considered possible. For instance, through use of the trifluoroacetic acid-based etchant, thick polymeric structures can be formed that exhibit well defined porosity. In one embodiment, a structure (e.g., a film) having a thickness on the order of several millimeters, e.g. about 1 millimeter or greater, for instance a structure having a thickness of from 1 to about 2 millimeters, can be etched with the trifluoroacetic acid-based etchant to form a well-defined porosity across the entire thickness of the structure with essentially no degradation of the nanostructure morphology. Of course, the disclosed etchants are not limited to utilization with thick polymeric starting materials, and the etchant can provide fast and highly selective etching of thinner materials in some embodiments. By way of example, in some embodiments a structure having a thickness of from about 10 nanometers to about 100 millimeters can be etched by use of the etchant.

Trifluoroacetic acid (TFA) is a widely used agent for hydrolytic ester cleavage in preparative organic chemistry owing to its high acidity (low pKa) and concomitant miscibility with both water and organic solvents. This latter characteristic can be beneficial in those embodiments in which surface wetting of hydrophobic pores formed by the etchant is desired, for instance when etching beyond the perimeter of the pore. For example, an etchant solution can include an amount of a solvent (or a mixture of solvents) that is miscible with the TFA and that will not dissolve the polymer, such as a low molecular weight alcohol. For instance, an etchant solution can include a $C_1$ to $C_4$ alcohol such as methanol, ethanol, propanol, isopropanol, tert-butanol, etc., or mixtures thereof. In one embodiment, the etchant solution can include water and a $C_1$ to $C_4$ alcohol (or a mixture thereof) in a volume ratio of from about 90:10 to about 10:90.

In general, an etchant composition can include the TFA in a concentration of about 10 M or less, e.g., from about 0.01 molar to about 8M in some embodiments. While the etchant solutions are not limited to such concentrations, as discussed further in the examples section below, higher concentration solutions can in some embodiments lead to loss of the ordered morphology of the etched materials, and thus may be avoided in some embodiments.

During use, the etchant composition can contact the multicomponent polymer in any suitable form, e.g., in a liquid or vapor phase. A preferred TFA concentration for an etchant composition can depend, among other parameters, upon this aspect of an etching process. For instance, and as discussed in more detail in the examples section below, while etch rate can increase with TFA concentration independent of the etchant form, the etch rate will vary from one etchant form to another. For instance, etching via immersion of a structure in an etchant solution can demonstrate a higher etch rate than etching via contact with a vapor of the etchant. As such, a lower TFA concentration in an immersion protocol can be equally as effective as a higher TFA concentration in a vapor contact protocol. Accordingly, the cost savings available through formation of a lower concentration etchant may be preferred in some embodiments. However, a vapor etchant protocol may be preferred in other embodiments due to, e.g., the characteristics of the structure to be etched or characteristics of the etching environment. Such process design considerations are well understood by those of skill in the art.

The etchant composition can selective etch a hydrolysable component from any suitable ordered multi-component polymer that includes a hydrolysable component in conjunction with a non-hydrolysable component; the non-hydrolysable component being unaffected by contact with the etchant composition. A multicomponent polymer can include, for example, a random copolymer, a block copolymer, a polymer blend, or combinations thereof. For instance, a block copolymer comprising both a hydrolysable block and a non-hydrolysable block can be etched. In one embodiment, a self-assembled block copolymer including at least one hydrophilic block and at least one hydrophobic block can be etched. In general, any multicomponent polymer that phase separates and contains a hydrolysable component can be etched by use of the TFA-based etchant solution. Through selection and control of the components and formation characteristics of the multi-component polymer mixture, a porous structure having a desired morphology can be provided.

In general, the hydrolysable component can include ester bonds that will be subject to hydrolysis by the TFA composition. For instance, the hydrolysable component can include an aliphatic polyester block that includes poly(L-lactide), poly(D,L-lactide), poly(D-lactide-co-glycolide), poly(L-lactide-co-glycolide), poly(D,L-lactide-co-glycolide), polycaprolactone, polyvalerolactone, polyhydroxybutyrate, polyhydroxyvalerate, poly(1,4-dioxan-2-one), polyorthoester as well as copolymers including any combination thereof.

The polyester block(s) can have various molar concentrations of the monomers used in forming the polyester block(s). For instance, a polyester block can include lactide at a molar concentration in the polyester block of about 60% or more, or about 80% or more in some embodiments, though any molar concentration for the polyester block is encompassed herein. Polylactide is a commonly used sacrificial block for the preparation of porous polymers from ordered block copolymers. In a block copolymer in which the polyester block includes polymerized lactide monomer, the lactide can be DL-lactide, D-lactide, or L-lactide.

In some embodiments, the polyester block can include polymerized glycolide monomer (e.g., poly(lactide-co-glycolide)). For instance, a polyester block can include glycolide monomer at a molar concentration in the polyester block of between about 10% and about 75%, though the invention is in no way limited to a glycolide monomer concentration in this range.

The hydrolysable block(s) of the copolymer can generally have a number average molecular weight ($M_n$) in a range of from about 1,000 g/mol to about 50,000 g/mol, for instance from about 10,000 g/mol to about 30,000 g/mol in some embodiments.

The multicomponent polymer can also include a non-hydrolysable component that will be chemically unaffected by the TFA etchant composition. For instance, the non-hydrolysable component can include the polymerization product of monomers such as styrene-containing or diene monomers or combinations thereof including, without limitation, polystyrene, poly(styrene-b-vinyl pyridine), poly(styrene-b-butadiene), poly(styrene-b-isoprene), polyisoprene, polybutadiene, or a combination comprising at least one of the above.

The non-hydrolysable block(s) of the multicomponent polymer can generally have a number average molecular weight in a range of from about 1,000 g/mol to about 50,000 g/mol, for instance from about 10,000 g/mol to about 30,000 g/mol in some embodiments.

Typically, a multicomponent polymer, e.g., a complete copolymer or a polymer of a blend, can have a number average molecular weight of from about 1,000 g/mol to about 1,000,000 g/mol and a polydispersity ($M_w/M_n$) of from 1.01 to about 6 some embodiments. Molecular weight, both Mw and Mn, can be determined by, for example, gel permeation chromatography using a universal calibration method, calibrated to polystyrene standards. The sizes of the individual blocks of the copolymer can be such to ensure that the polymer blocks have enough mobility to undergo self-assembly, e.g., spontaneously, or by using a purely thermal treatment, or through a thermal process which is assisted by the absorption of solvent vapor into the polymer framework to increase flow of segments enabling self-assembly to occur.

A structure can generally be formed of the multicomponent polymer prior to etching of the polymer. For instance, and depending upon the particular components of the multicomponent polymer, a multicomponent polymer can be solution or melt processed to form a structure, e.g., a film, that can then be etched by use of the TFA composition to form a porous, polymeric structure.

Some suitable solution deposition techniques may include, for instance, casting, roller coating, dip coating, spray coating, spinner coating, curtain coating, slot coating, screen printing, bar coating methods, etc. Suitable solvents for forming a solution of the copolymer may include, for instance, aprotric solvents, protic solvents, as well as mixtures thereof. Regardless of the solvents selected, the resulting formation solution typically contains solvents in an amount of from about 60 wt. % to about 99 wt. %.

In one particular embodiment, the multicomponent polymer can be solution cast onto a substrate as a film. If desired, the solvent(s) may be removed through a variety of different methods, such as by heating, pressure reduction, ventilation, etc. In one particular embodiment, the solvent(s) are vaporized under ventilation.

Following formation of the polymeric structure, the multicomponent polymer of the structure can be contacted with the TFA etchant composition upon which the hydrolysable block(s) of the polymer can be selectively removed from the structure with little or no degradation of the nanostructure morphology of the remaining non-hydrolysable block(s). For instance, the structure can be immersed in a solution of the etchant composition or contacted with a vapor of the etchant composition. As discussed previously, the high etch rate of the TFA etchant can enable the selective removal of the hydrolysable block in a relatively fast process, generally on the order of hours, as compared to the multi-day etch processes necessary when considering previously known alkaline-based etchants. The use of the fast etch process can decrease the extent of any damage to the non-hydrolysable block(s) of the multicomponent polymer to be below a detection limit. Moreover, etching by use of the TFA solutions can preserve the morphology of the remaining non-hydrolysable portions from that of the starting copolymer structure. For example, in some embodiments, the only product of the etching process can be pristine porous non-hydrolysable polymer having a molar mass distribution indistinguishable from a starting homopolymer. In other words, the TFA etch process can lead to no detectable damage to the non-hydrolysable block. The disclosed TFA etch composition and process can beneficially impact numerous nanomaterial developments based upon access to porous polymers.

The present disclosure may be better understood with reference to the Examples set forth below.

Example 1

Materials

Styrene (99%, Acros Organics) was used after passage through a basic alumina column. 3,6-dimethy-1,4-dioxane-2,5-dione (99%, Acros Organics) or D,L-lactide was dried overnight in a vacuum oven at 40° C. just prior use. 2-hydroxyethyl-2-bromoisobutyrate (95%, Aldrich), tris-[2-(dimethylamino)ethyl]amine (97%, Aldrich), tin(II) ethylhexanoate (92%, Aldrich), benzoic acid (99.5%, Aldrich), trifluoroacetic acid (99.5%, Acros Organics) sodium hydroxide (97%, pellet, Sigma Aldrich) were used as received. Copper(I) bromide (99.99%, Aldrich), cylochexylamine (99%, Alfa Aesar), 3,5-bis(trifluoromethylphenyl isothiocyanate) (98%, Aldrich), anhydrous chloroform (stabilized with amylene, 99.9%, Acros Organics) were stored inside a glove box and used as received. 1,8-diazabicyclo [5.4.0]undec-7-ene (98%, Aldrich) was dried over calcium hydride and then filtered in a glovebox using a nylon syringe filter (0.45 μm). Tetrahydrofuran (99.5%, Macron), methanol (99.8%, BDH), and toluene (99.5%, Macron) were used as received.

Synthesis of Hydroxyl Terminated Polystyrene (PS-OH) Macroinitiator:

A polystyrene macroinitiator (PS-OH) was synthesized via ARGET-ATRP using a reagent ratio of [Styrene]:[2hydroxyethylbromoisobutyrate]:[Me6TREN]:[Cu(I)]:[Sn (II)]= 300:1:0.105:0.005:0.1. To a schlenk flask, 66 mL of inhibitor-free styrene (576 mmol) and 278 μL 2-hydroxy-2-ethylbromoisobutyrate (1.92 mmol) were added. The flask was degassed by three freeze-pump-thaw (FPT) cycles and backfilled with nitrogen ($N_2$) gas. A catalyst stock solution of 1 mL of toluene containing 1.4 mg Cu(I)Br (0.0096 mmol), 53.8 μL (0.2 mmol) Me6TREN ligand and 62.2 μL Sn(II) ethylhexanoate (0.192 mmol) were added to the reaction flask under flowing $N_2$ gas. This reaction mixture was then placed into a pre-heated oil bath with constant stirring. The polymerization was continued for 10 hr and at the end the reaction mixture was cooled with ice water before exposing the solution to air. The crude polymerization solution was diluted with tetrahydrofuran (THF) and precipitated two times into 10-fold excess of cold methanol. The product was filtered and vacuum dried at 50° C. for 24 hr. The number average molecular weight ($M_e$) of PS-OH was 12.9 kg mol-1 and molar mass dispersity (Đ)=1.21 were determined with a polystyrene (PS)-calibrated GPC.

Synthesis of Co-Catalyst Bis(3,5-Trifluoromethyl)Phenylcyclohexylthiourea

The synthesis was performed in a glovebox where 3,5-bis(trifluoromethyl) phenylisothiocyanate (3.37 mL, 18.5 mmol) and anhydrous THF (20 mL) were combined in a round bottom flask that was previously dried by heat-gun and contained a magnetic stir bar. In the glovebox, cyclohexylamine (2.11 mL, 18.5 mmol) was added to the stirring solution dropwise via a syringe. The reaction continued at room temperature for 24 hr and then THF was removed using a rotary evaporator. The white residue was recrystallized twice from chloroform and stored in the glove box after drying under vacuum at 50° C. for 48 hr.

Synthesis of PS-b-PLA

The PS-OH macroinitiator was chain extended from the terminal hydroxyl group via organocatalytic ring-opening polymerization (ROP) using a reagent ratio of [PS-OH]:[Lactide]:[DBU]:[Thiourea]=1:250:1.34:1.34. Before starting the reaction, the PS-OH macroinitiator and D,L-Lactide monomer were each dried separately overnight at 40° C. under high vacuum before transfer to a glove box via a sealed schlenk flask. The PS-OH (1 g, 77.1 μmol) and lactide monomer (2.8 g, 19.3 mmol) were combined with thiourea co-catalyst (37 mg, 103 μmol). All the reagents were dissolved in 5 mL of anhydrous chloroform. After dissolution, the DBU catalyst (41 μL, 103 μmol) was added to the polymerization mixture dropwise and the reaction was stirred at room temperature for 60 min. The reaction mixture was terminated by adding benzoic acid (12.6 mg, 103 μmol). The polymer solution was precipitated twice into 10 fold excess of cold methanol. The white solid was collected by filtration and dried under vacuum at 40° C. for 24 hr. The molar mass was determined to be $M_n$=41.6 kg/mol with PLA $M_n$=28.6 kg/mol (79% monomer conversion), as calculated from $^1$H NMR results. GPC confirmed a narrow molar mass dispersity Đ=1.16.

Sample Preparation

PS-b-PLA copolymer films were prepared by solution casting from toluene (10 wt. % of polymer, filtered through 0.2 μm filter) into a Teflon dish placed on a hotplate set to 50° C. The film was left to dry for 8 hr and then transferred to a vacuum oven set to 40° C. for another 2 hr to remove trace solvent. The dried sample was annealed at 110° C. for 1 hr in a vacuum oven. The oven was vented to atmospheric pressure and the sample quenched to room temperature. The resulting "as-made" film sample was used for subsequent etching experiments.

PLA Etching by TFA Immersion

A portion of the as-made film 2 mm in thickness and greater than about 1 $cm^2$ in area was immersed in a glass vial containing 10 mL of TFA solution. The sample etch rates were compared by maintaining a constant minimum sample dimension of 2 mm in thickness. TFA etchant solutions were prepared using a range of molarities from 0.01-8M, as prepared in a 70:30 mixture by volume of methanol:water. The vial containing etchant and sample was placed in an oven pre-heated to 40° C. for the desired amount of time. After etch treatment, the film was rinsed thoroughly with water and immersed in methanol for 10 minutes before drying in a vacuum oven set to 30° C. for 4 hr.

PLA Etching by TFA Vapor

A portion of the as-made film 2 mm in thickness and greater than about 1 $cm^2$ in area was placed in an aluminum dish. The same range of TFA etchant solution as used in the immersion technique was examined for vapor etching. The resulting TFA solution (10 mL) was placed in a glass vial. The aluminum dish and glass vial were both placed within a plastic jar and the entire assembly was placed within an oven pre-heated to 40° C. for a predetermined amount of time. After etch treatment, the film was rinsed thoroughly with water and immersed in methanol for 10 minutes before drying in a vacuum oven at 30° C. for 4 hr.

PLA Etching by 0.5 M NaOH

For comparison, a portion of the as-made film was immersed in 0.5 M NaOH in a 40:60 mixture by volume of methanol:water and etching was conducted for 3 days at 60° C. according to known methodology. After etch treatment, the film was rinsed thoroughly with water and methanol. The extent of PLA etch and the morphology were monitored by $^1$H NMR and SAXS, respectively.

PLA Etch Kinetics

The etch rate was determined by monitoring the etching of planar films. Here the minimum film dimension was maintained at 2 mm in thickness. For an anisotropic shape with an isotropic etchant, the film thickness will largely determine the etch time and allow the estimation of the etch rate by minimizing edge effects. The extent of the PLA removal was monitored using $^1$H NMR on portions of film as a function of etch time. The disappearance of the non-convolved PLA proton (FIG. 5, proton-g) was compared to the non-convolved PS protons (FIG. 5, protons-a) to quantify the amount of PLA remaining relative to the starting di-block copolymer. The spectra were normalized to have the a-integral correspond to the 5*DPPS where the PLA remaining was quantified as DPPLA=g-integral. The etch rate was calculated using rate (nm/s)=(film thickness (nm)×% PLA degraded)/(2×etching time (s)). This calculation assumed a constant velocity of the etch interface and the factor of 2 accounts for etching from both of the exposed film surfaces. The assumption of linear etch rates was supported by time resolved measurements.

Molecular Characterization

All proton nuclear magnetic resonance ($^1$H NMR) and heteronuclear single quantum coherence (HSQC) spectra were recorded on Bruker Avance III HD 300. NMR samples were prepared in deuterated chloroform ($CDCl_3$) at a concentration of ~1 wt. %. Number average molecular weight ($M_n$) and molar mass dispersity (Đ) were determined using a Waters gel permeation chromatography (GPC) instrument equipped with a 515 HPLC pump, a 2410 refractive index detector, and three styragel columns (HR1, HR3, and HR4 in the effective molecular weight range of 0.1-5, 0.5-30, and 5-600 kg/mol respectively). THF was used as the eluent at 30° C. at a flow rate of 1 mL/min. The GPC was calibrated with PS standards (2,570, 1,090, 579, 246, 130, 67.5, 34.8, 18.1, 10.4, 3.4, 1.6 kg/mol) obtained from Polymer Laboratories. GPC samples were prepared by dissolving the sample in THF at a concentration of 2.0 mg/mL and were filtered (0.2 μm) just prior to injection.

Small-Angle X-Ray Scattering (SAXS)

X-ray scattering experiments were conducted using a SAXSLab Ganesha at the South Carolina SAXS Collaborative. A Xenocs GeniX3D microfocus source was used with a Cu target to generate a monochromic beam with a 0.154 nm wavelength. The instrument was calibrated using National Institute of Standards and Technology (NIST) reference material, 640c silicon powder with the peak position at $2\theta=28.44°$ where 2θ is the total scattering angle. A Pilatus 300 K detector (Dectris) was used to collect the two-dimensional (2D) scattering patterns with the incident beam normal to the planar sample surface. 2D images were azimuthally integrated to one-dimensional (1D) data of intensity (I) versus q (momentum transfer). All data were acquired after one hr of measurement with an X-ray flux of ~4.1 M photons/s incident upon the sample. SAXS data were fit using custom MATLAB software.

Field Emission Scanning Electron Microscopy (FE-SEM)

After PLA etching, samples were mounted on brass shims using carbon adhesive (Electron Microscopy Sciences) and imaged normal to the planar film surface. Samples were sputter coated with gold-palladium alloy using a Denton Desk II Sputter Coater with global rotation and tilt to avoid sample charging. Images were acquired using an acceleration voltage of 5 keV with an in-lens secondary electron detector. The working distance was fixed to 3.00 mm or less for the acquisition of the images.

Results

The PS-b-PLA had a molar mass of 41.6 kg/mol and contained 66 vol. % of PLA with a molar mass dispersity (Đ) of 1.16 as shown in Table 1, below.

TABLE 1

| Sample | $M_{n, PS}$ (kg/mol)[a] | $M_{n, PLA}$ (kg/mol)[b] | Total $M_n$ (kg/mol)[c] | Đ[a] | $f^V_{PS}$[d] | $f^V_{PLA}$[d] | Morphology[e] |
|---|---|---|---|---|---|---|---|
| PS-b-PLA | 12.9 | 28.6 | 41.6 | 1.16 | 0.34 | 0.66 | LAM |

[a] obtained from GPC analysis
[b] obtained from ¹H NMR analysis
[c] obtained from a + b
[d] volume fractions ($f^V$) calculated using densities at 110° C., PS = 1.02 g/cm³, PLA = 1.18 g/cm³
[e] Morphology determined by SAXS The 2D SAXS pattern of the as-made 2 mm thick film consisted of isotropic rings, indicating a homogeneous distribution of grain orientations with abundant grain boundaries as a worst-case scenario for etching. The scattering profile was consistent with LAM symmetry, having peaks observed at q/q*=1, 2, 3, and 4 with a d-spacing of 33.9 nm.

Figure 1:
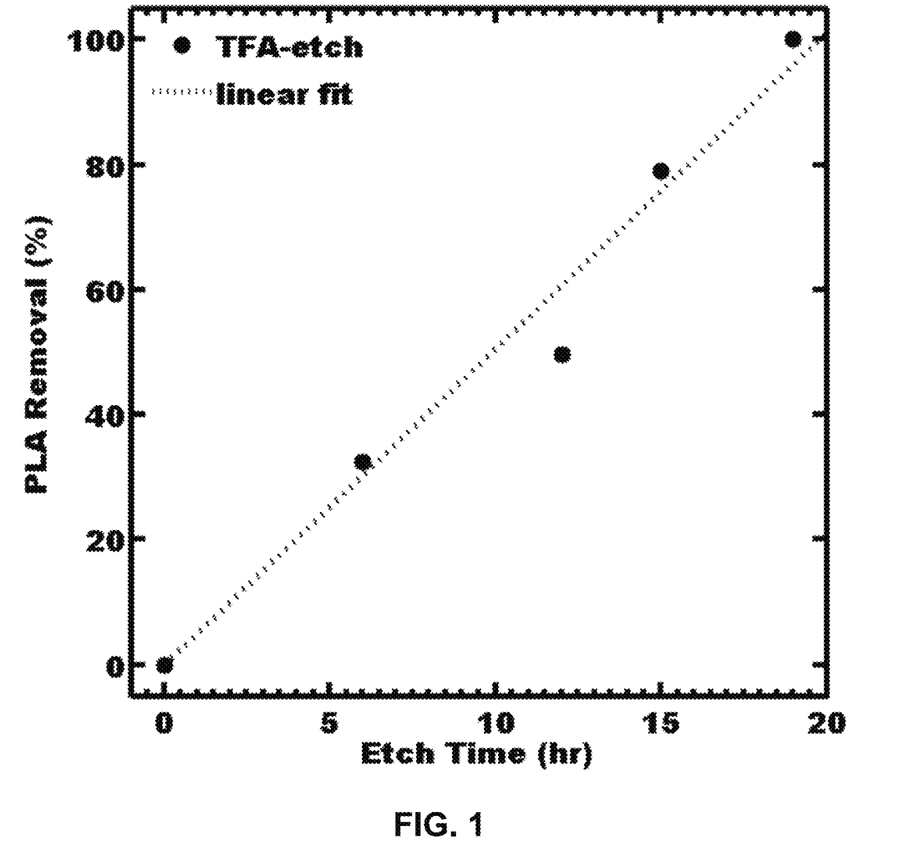
FIG. 1 illustrates PLA etch kinetics for a poly(styrene-b-lactide) (PS-b-PLA) copolymer film immersed in a solution of a trifluoroacetic acid (TFA) etchant as described herein.

The 1 M liquid TFA etch kinetics were monitored by 1H NMR by the disappearance of PLA at δ5.19 ppm. The TFA immersion etch kinetics were linear ($r^2$=0.98) with a best-fit etch rate of 14 nm/s (FIG. 1).

Characteristics of the etched samples are shown in Table 2, below. The TFA liquid immersion fully etched sample was termed "TFA-etch" as shown. Sample TFA-etch was stable under ambient conditions and was somewhat brittle due to the high $T_g$ of PS. For comparison, an as-made film was etched with a popular 0.5 M NaOH etchant at 60° C. and was termed "NaOH-etch". The PLA was completely removed after 3 days of NaOH etching, corresponding to an etch rate of 3.8 nm/s. This etch rate is considerably slower than the 14 nm/s found with immersion in 1 M TFA at 40° C., despite the slightly reduced temperature.

TABLE 2

| Sample Name | Etch rate (nm/s) | LAM Morphology | d-spacing (nm) | Observed SAXS reflections (q/q*) | Etch time (hrs) | Etch Conditions |
|---|---|---|---|---|---|---|
| As-made | — | — | 33.8 | 1, 2 | 0 | — |
| TFA-etch | 14 | Preserved | 33.9 | 1, 2, 4 | 19 | Immersed in 1M TFA |
| TFA-etch vapor | 9.5 | Preserved | 33.1 | 1, 2, 4 | 32 | In contact with 8M TFA vapor |
| NaOH-etch | 3.8 | Degraded | — | — | 72 | Immersed in 0.5M NaOH |

Figure 2A:
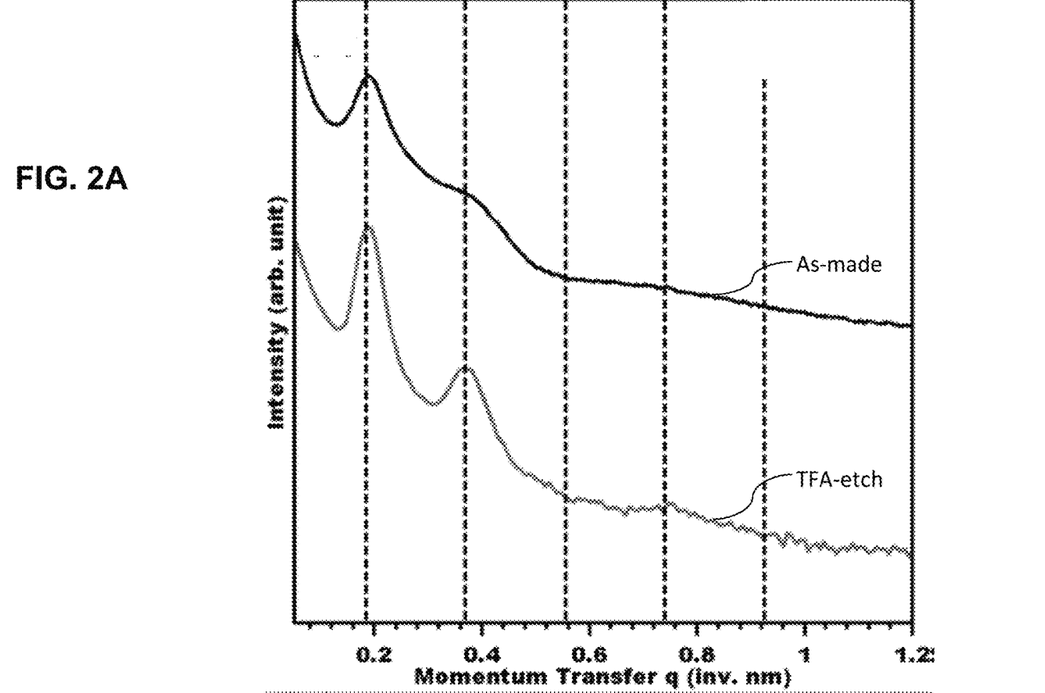
FIG. 2A illustrates SAXS of as-made PS-b-PLA copolymer film compared to a sample fully etched by immersion in 1M TFA solution.
Figure 2B:
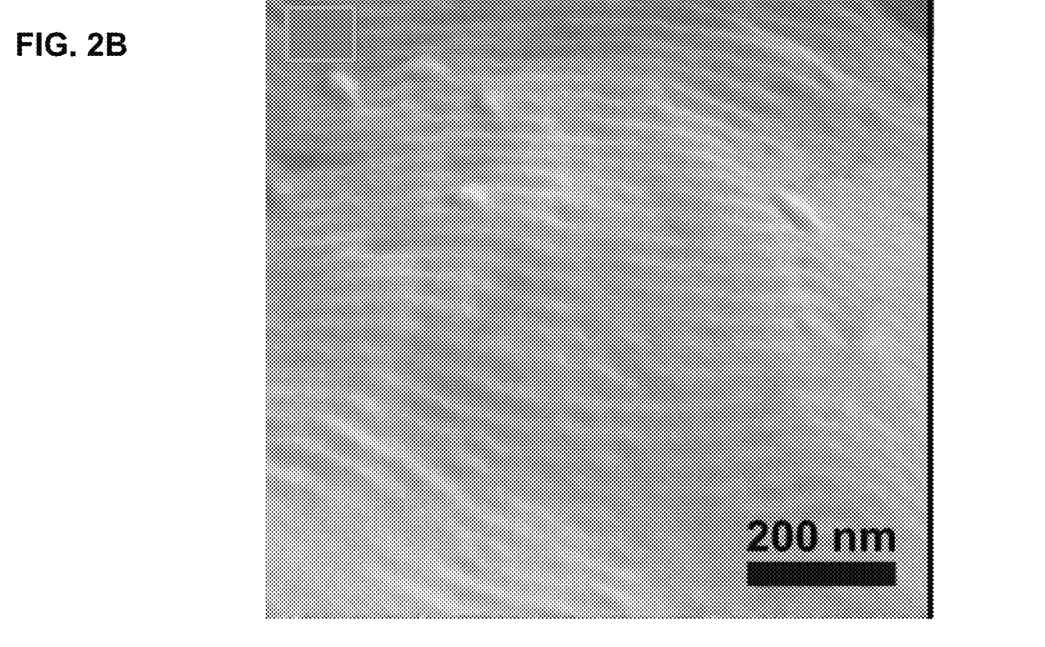
FIG. 2B illustrates a top-view SEM image of a mesoporous film etched via immersion in a TFA-based etchant as described herein.

The morphology before and after etching was compared by SAXS. Measurements of sample TFA-etch (FIG. 2A) exhibited the same series of highly ordered SAXS reflections as the as-made sample, indicating that both the unit cell symmetry and lattice parameters were preserved through the TFA etch. The samples were indexed for LAM symmetry with peaks indicated at q/q*=1, 2, 3, and 4 where q=4π sin(θ)/λ. (The lines in FIG. 2A were offset vertically for clarity.) The presence of mesopores was evidenced by the combination of mesostructure preservation (SAXS and SEM) combined with ¹H NMR demonstrating complete removal of the PLA phase. SEM image of the sample "TFA-etch" (FIG. 2B) confirmed the preservation of the ordered morphology with a d-spacing of 31.8±4.0 nm, consistent with the SAXS findings.

Figure 3A:
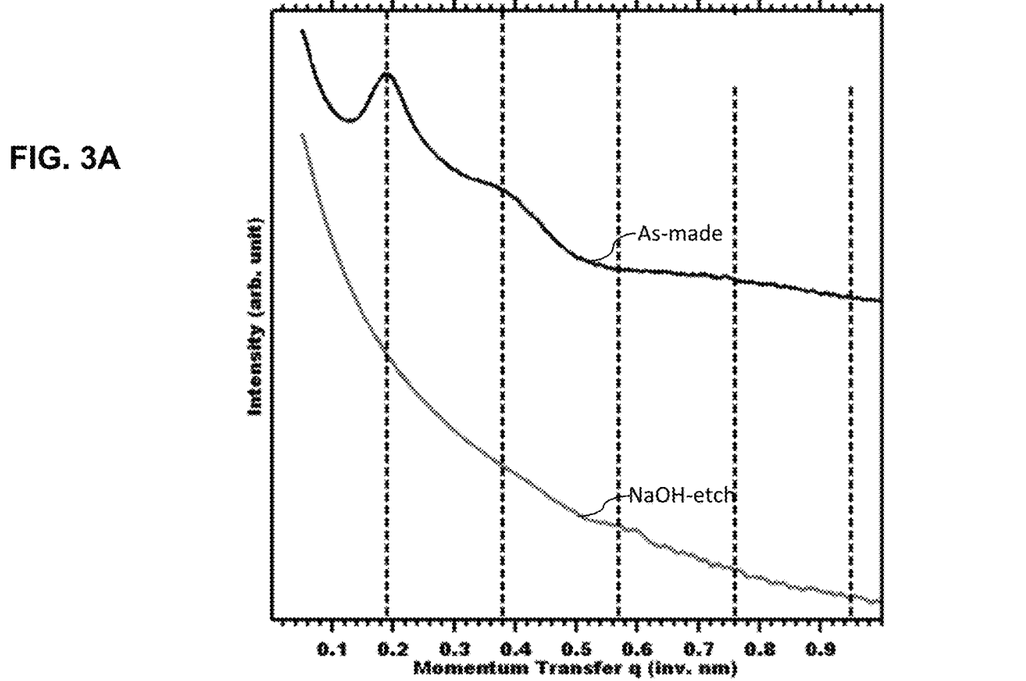
FIG. 3A illustrates SAXS of as-made PS-b-PLA copolymer film compared to a sample fully etched by use of NaOH.
Figure 3B:
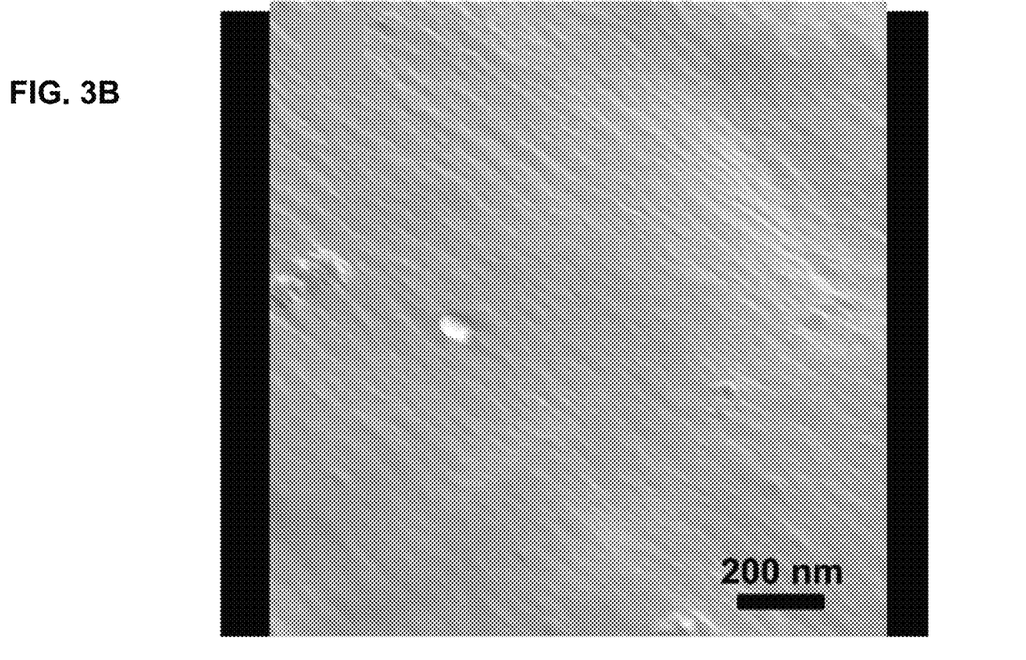
FIG. 3B illustrates a top-view SEM image of the sample etched by use of NaOH.

In comparison to the TFA etch, the complete removal of PLA by 0.5 M NaOH required a significantly longer 3 day exposure to etchant and resulted in morphology degradation evidenced by a few weak SAXS shoulders (FIG. 3A). The NaOH samples were also indexed for LAM symmetry with peaks indicated at $q/q^*=1, 2, 3, 4$, and 5. (The scattering data are offset vertically in the figures for clarity.) Although NaOH has been widely used successfully to etch thinner <1 mm films, these data suggest that modified conditions may be more efficacious for few-mm thick films.

Figure 4:
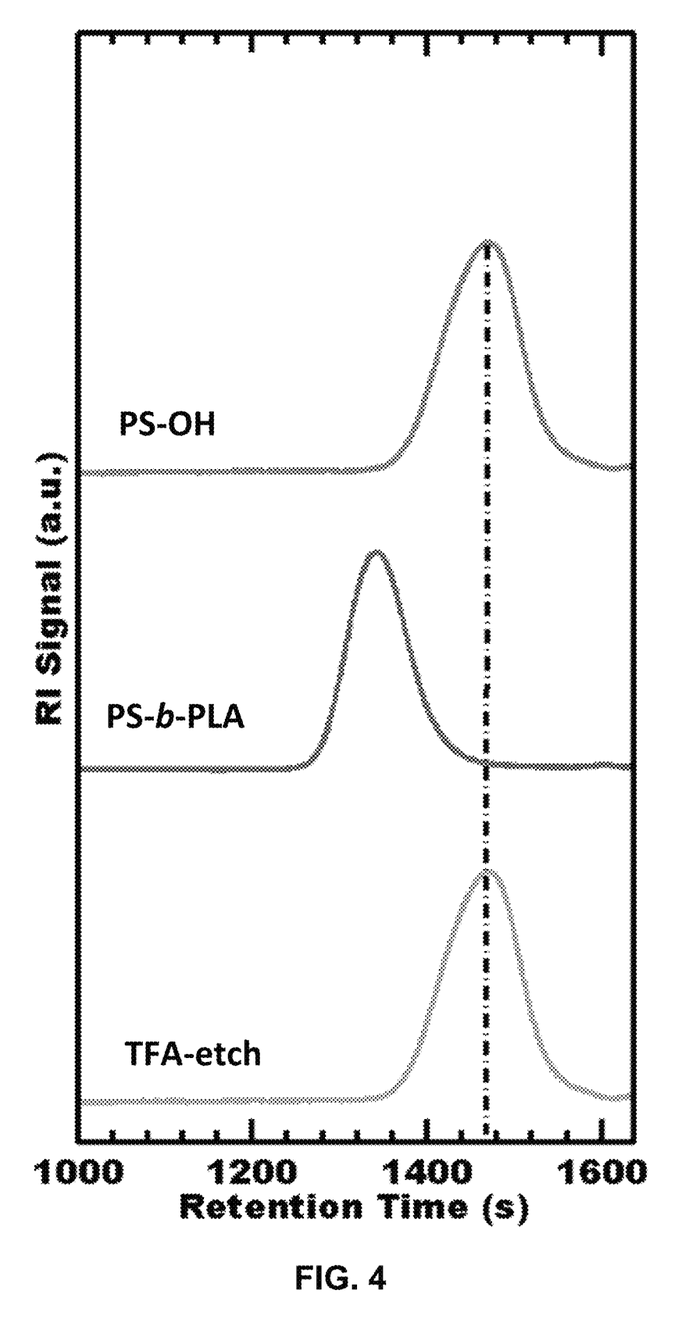
FIG. 4 presents gel permeation chromatography (GPC) traces of a polystyrene macroinitiator used to make a copolymer film, the copolymer film formed from the macroinitiator, as well as the fully etched sample film.

The selectivity of TFA as an etchant was further examined in terms of PS degradation by both GPC and $^1$H NMR. During synthesis, GPC demonstrated chain extension from the PS-OH macroinitiator to the final PS-b-PLA di-block copolymer. After TFA etching, GPC elugrams exhibited a nearly identical molar mass distribution to that of the parent PS-OH macrointiator (Table 3) and was consistent with 100% PLA removal without observable damage to PS (FIG. 4).

TABLE 3

| Sample | $M_n$ (kg/mol) | Đ |
|---|---|---|
| PS-OH | 13.0 | 1.21 |
| PS-b-PLA | 57.6 | 1.16 |
| TFA-etch | 13.0 | 1.20 |

Figure 5:
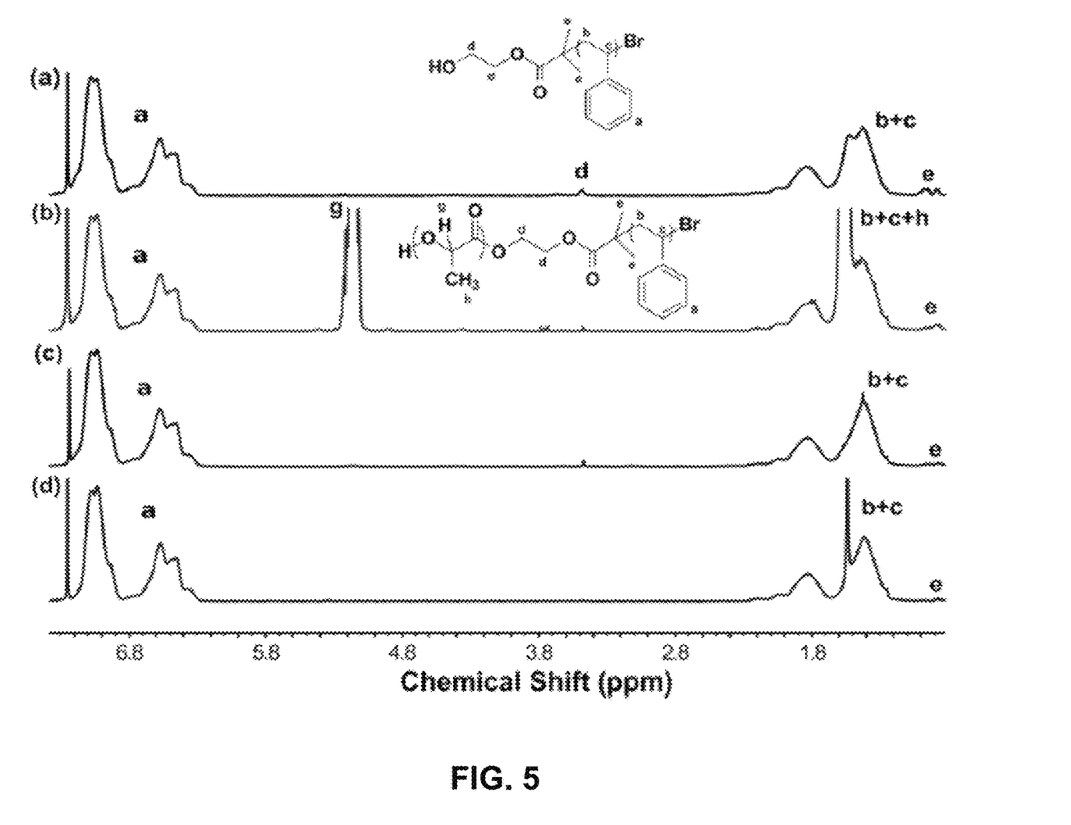
FIG. 5 presents the $^1H$ NMR spectra of (a) PS-OH macromer initiator (b) as formed copolymer PS-b-PLA before etching (c) NaOH-etched sample and (d) TFA-etched sample.

As shown in complimentary $^1$H NMR data of FIG. 5, there was complete removal upon etching of the PLA proton-g that is visible at 5.19 ppm of the copolymer spectrum at (b), without noticeable change to the PS spectra. The new peak at 1.5 ppm in (d) was attributed to water and was confirmed to not be associated with the PS carbon by HSQC spectroscopy. It was noted that the initiator group (proton-d at 3.5 ppm) was removed by both NaOH and TFA etching procedures (FIG. 5, (c) and (d)).

Figure 6:
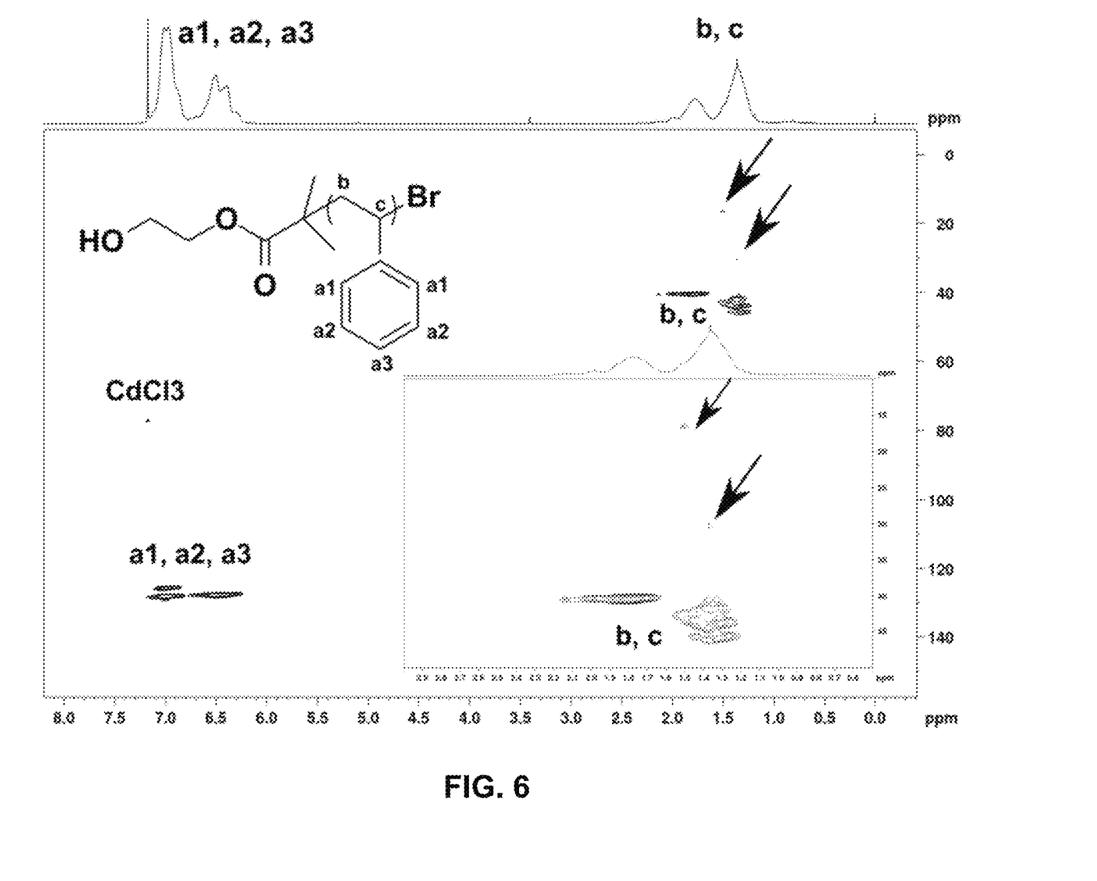
FIG. 6 presents the heteronuclear single quantum coherence (HSQC) spectroscopy results of an NaOH-etched sample.

The HSQC spectra of the NaOH-etched sample (FIG. 6) exhibited spectral changes in the $^1$H δ1.0-2.0 ppm range with two new correlated carbon peaks (δ40-44 ppm) (FIG. 6, arrows) that may correspond to damage to the PS backbone after the extended etch process needed for 2 mm thick films.

Figure 7:
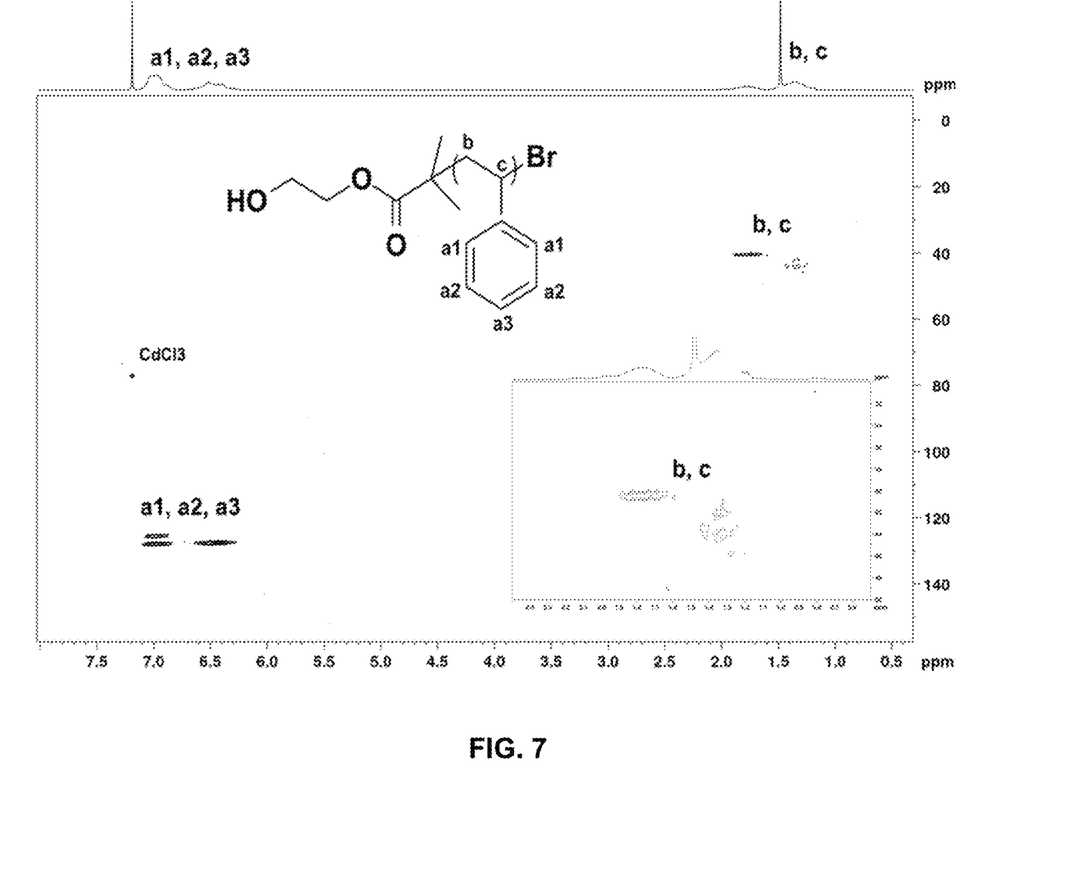
FIG. 7 presents the HSQC spectroscopy result of a TFA-etched sample.
Figure 8:
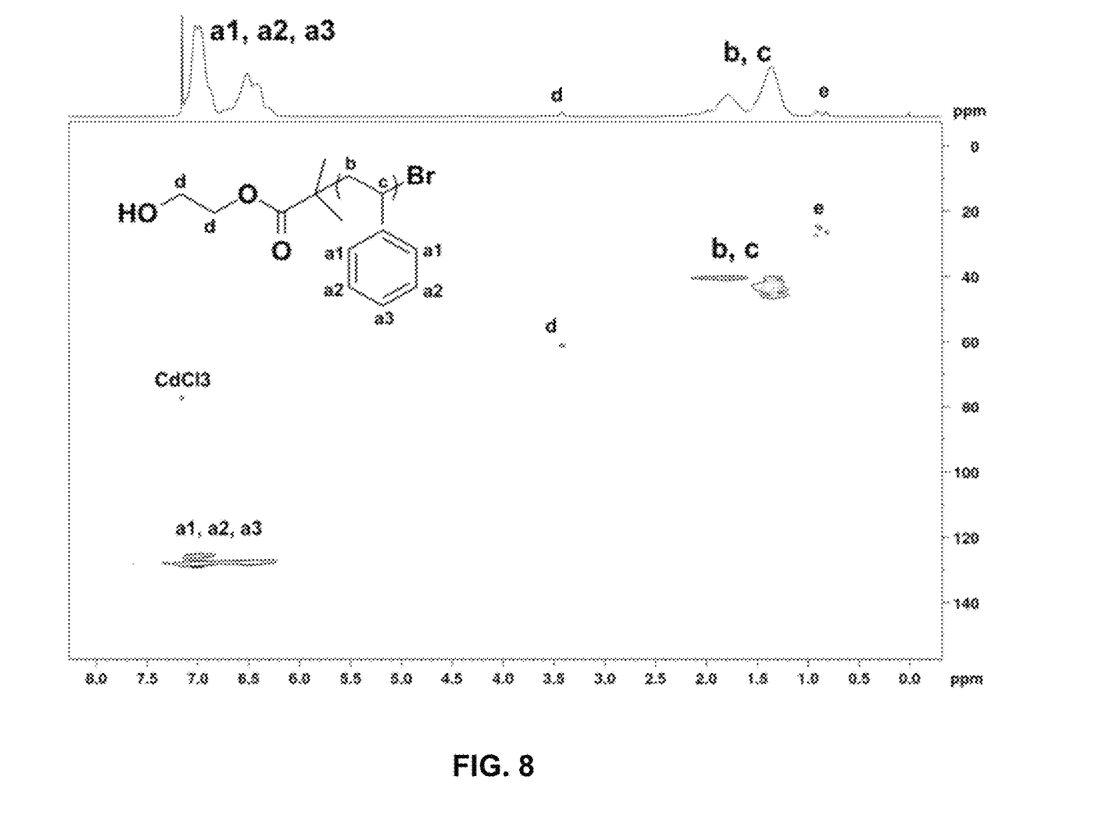
FIG. 8 presents the HSQC spectroscopy result of a polystyrene macroinitiator used in forming the copolymer.

HSQC spectra of the liquid TFA-etch (FIG. 7) and PS-OH macroinitiator samples (FIG. 8) exhibited the same peak correlations without apparent changes to the polymer. TFA was demonstrated to enable remarkable etch selectivity with rapid PLA removal and without apparent damage to the PS component.

Figure 9:
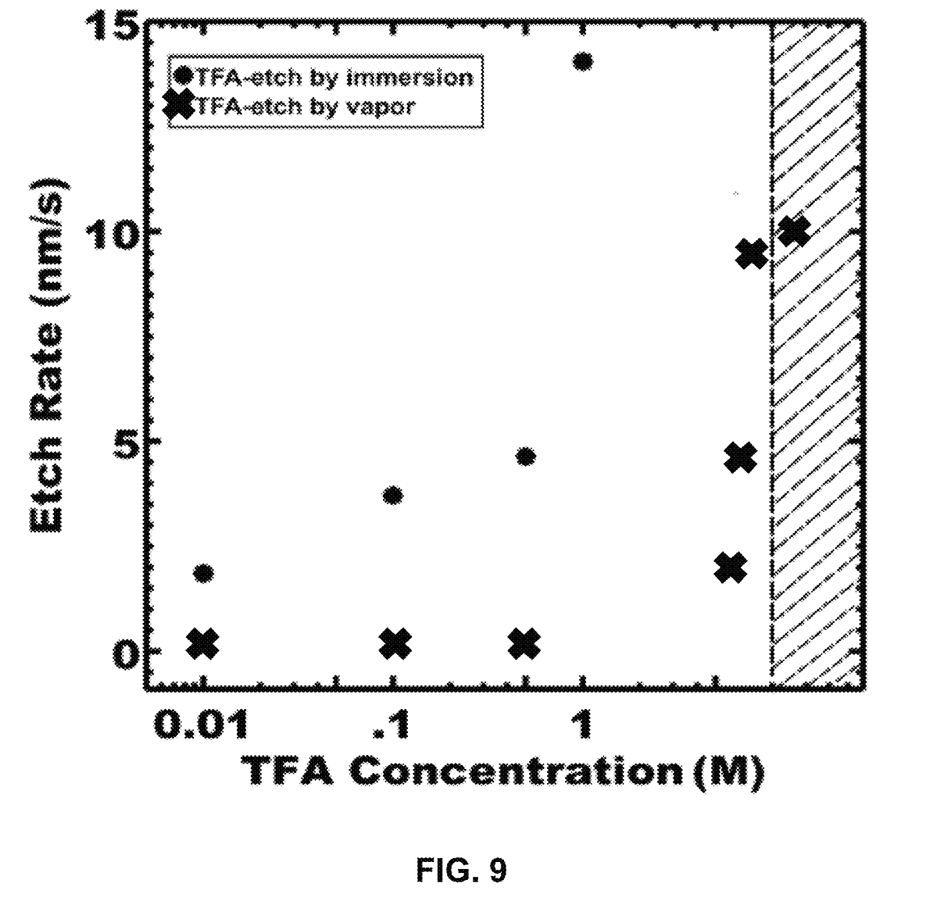
FIG. 9 illustrates etch rates with varying TFA concentration by either immersion or vapor exposure.
Figure 10A:
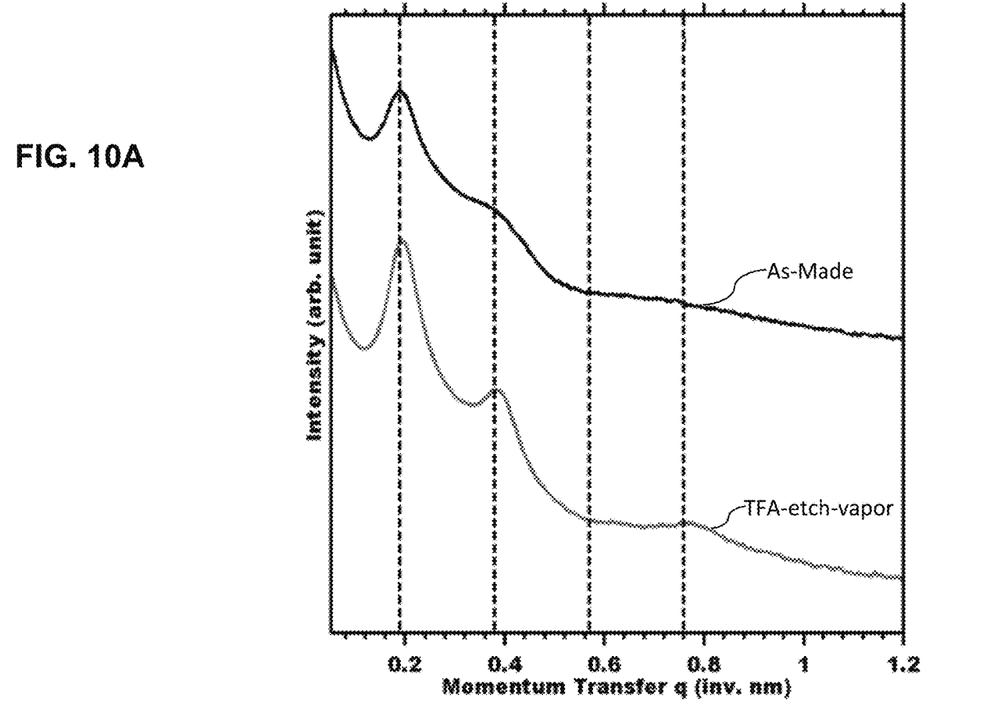
FIG. 10A illustrates as-made PS-b-PLA copolymer film compared to a sample fully etched by contact with 8M TFA vapor.

Etching by both direct immersion and vapor exposure were investigated separately. In both cases, the PLA etch rate increased with TFA concentration and etching by direct immersion was faster than by vapor exposure for any particular TFA molarity (FIG. 9). The etch rates were calculated after a 24 hr etch at 40° C., except for 1 M TFA liquid immersion and 8 M TFA vapor contact where PLA was completely removed in less time. The 8 M TFA vapor etch was linear ($r^2$=0.97) with a best fit etch rate of 9.5 nm/s. SAXS was used to examine the morphology at the end of the each process (FIG. 2A (liquid); FIG. 10A (vapor)). The lamellar morphology was generally preserved, except for samples within the shaded region of FIG. 9.

Figure 10B:
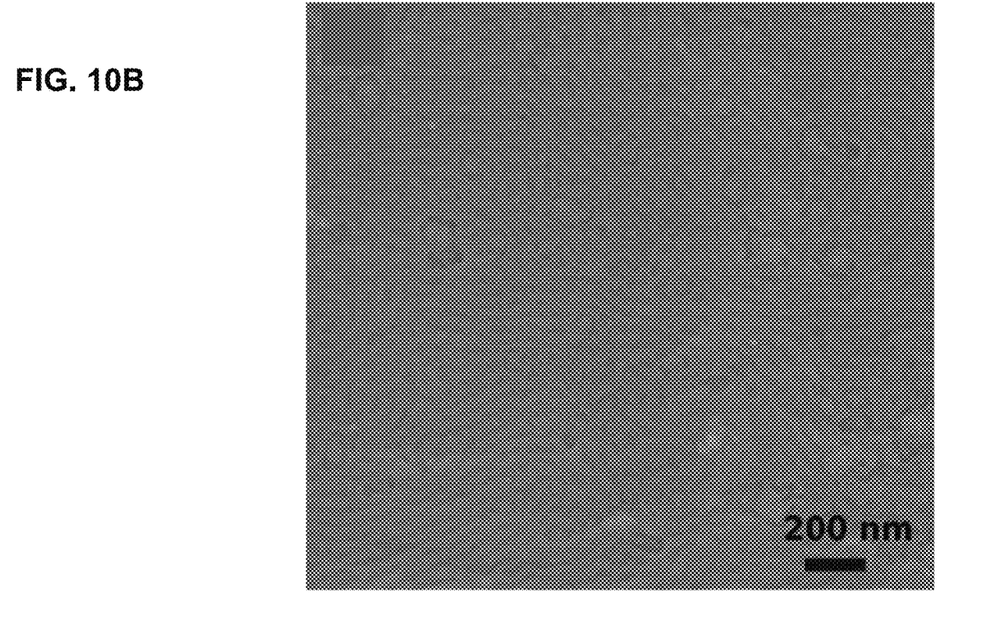
FIG. 10B illustrates a top-view SEM image of the mesoporous film etched via contact with a TFA-based vapor etchant.

In both liquid etchant and vapor etchant cases, an upper limit of TFA concentration was observed where the ordered morphology was lost, presumably due to plasticization of the glassy PS. For example, immersion in 8 M liquid TFA led to the fastest observed rate of 139 nm/s, corresponding to 100% PLA removal in 2 hr, however SAXS indicated collapse of the ordered morphology (FIG. 9 shown in shaded region). Such a high TFA concentration may plasticize the PS and lead to the collapse of the porous morphology. SAXS and SEM measurements also confirmed morphology preservation of TFA-etch-vapor after complete PLA removal (FIG. 10A, FIG. 10B).

Example 2

100% PLA removal and complete morphology retention was also demonstrated for a copolymer film displaying hexagonal morphology using the same 1 M TFA solution etching procedure of a copolymer film formed as described above. Table 4 provides characteristics of the PS-b-PLA copolymer film having a hexagonal morphology (PS-b-PLA2).

TABLE 4

| Sample | $M_{n, PS}$ (kg/mol)$^a$ | $M_{n, PLA}$ (kg/mol)$^b$ | Total $M_n$ (kg/mol)$^c$ | Đ$^a$ | $f^V_{PS}{}^d$ | $f^V_{PLA}{}^d$ | Morphology |
|---|---|---|---|---|---|---|---|
| PS-b-PLA2 | 13.9 | 13.9 | 27.8 | 1.23 | 0.54 | 0.46 | HEX |

Figure 11A:
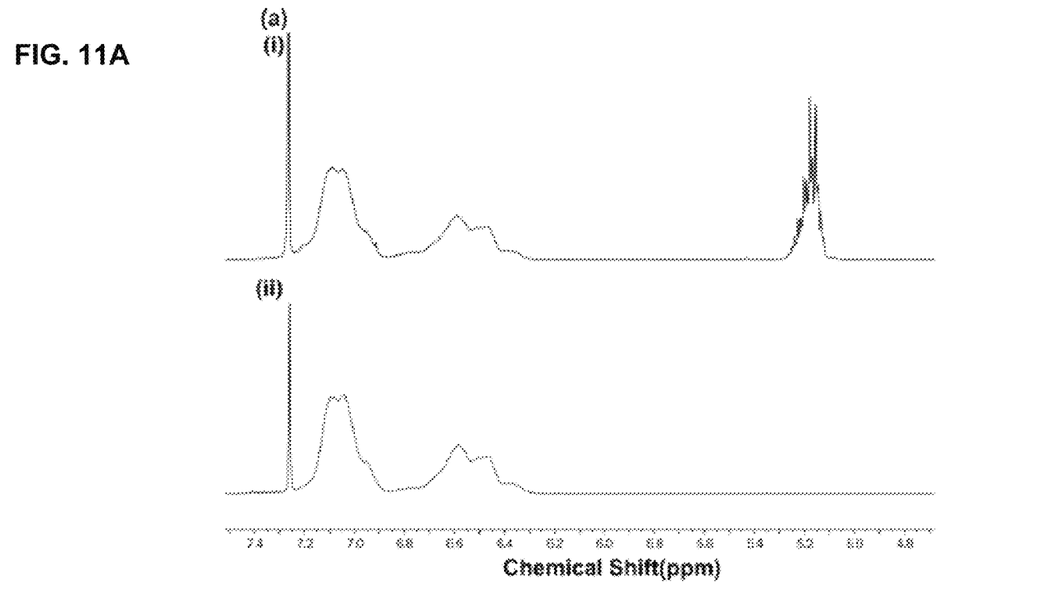
FIG. 11A illustrates the $^1$H NMR spectra of an as-made PS-b-PLA film having hexagonal morphology compared to a sample of the same film fully etched by immersion in 1M TFA.

$^a$obtained from GPC analysis
$^b$obtained from $^1$H NMR analysis
$^c$obtained from a + b
$^d$volume fractions ($f^V$) calculated using densities at 110° C., PS = 1.02 g/cm$^3$, PLA = 1.18 g/cm$^3$
$^e$Morphology determined by SAXS As shown in FIG. 11A, comparison of the HEX as-made film (i) and the 1 M TFA solution-etched film (immersion for 26 hrs) (ii) dissolved in CDCl$_3$ demonstrated 100% selective removal of PLA by the etchant (the PLA peak at 5.19 ppm disappeared following etching).

Figure 11B:
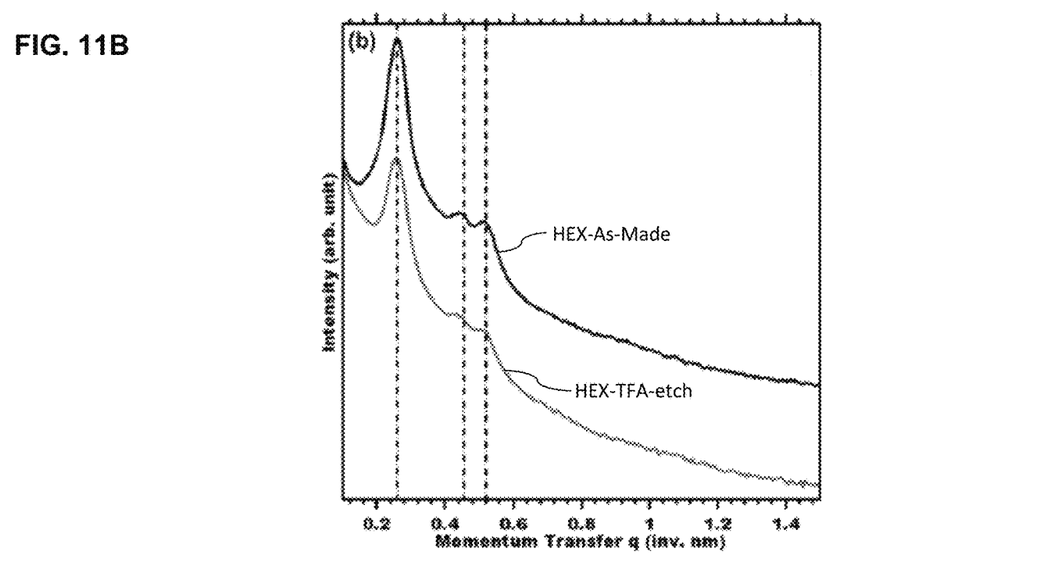
FIG. 11B illustrates the SAXS of the films demonstrating preservation of the hexagonal morphology through the etching process.

As illustrated in FIG. 11B, the hexagonal morphology of the as-made PS-b-PLA2 was preserved following etching. As shown, the principal peak (q*) in both scattering profiles is centered at 0.25 nm$^{-1}$. The samples were indexed for HEX symmetry with peaks indicated at $q/q^*=\sqrt{3}$, and $\sqrt{4}$. (The scattering data were offset in the figure for clarity.)

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a porous polymeric structure, the polymeric structure comprising a multi-component polymer, the method comprising contacting the multicomponent polymer of the polymeric structure with an etchant composition, the etchant composition comprising trifluoroacetic acid, the multi-component polymer comprising a hydrolysable component and a non-hydrolysable component, wherein upon the contact the hydrolysable component is selectively degraded thereby forming pores in the polymeric structure.

2. The method of claim 1, wherein the step of contacting the multi-component polymer with the etchant composition comprises immersing the polymeric structure in a solution comprising the etchant composition.

3. The method of claim 1, wherein the step of contacting the multi-component polymer with the etchant composition comprises contacting the polymeric structure with a vapor comprising the etchant composition.

4. The method of claim 1, wherein the polymeric structure comprises a film that includes the multi-component polymer.

5. The method of claim 4, wherein the film has a thickness of from 10 nanometers to about 100 millimeters.

6. The method of claim 1, the etchant composition comprising the trifluoroacetic acid in a concentration of about 10 molar or less.

7. The method of claim 1, the etchant composition further comprising one or more solvents miscible with the trifluoroacetic acid.

8. The method of claim 7, wherein the one or more solvents comprise a C1 to C4 alcohol.

9. The method of claim 1, the hydrolysable component comprising a polyester.

10. The method of claim 9, the polyester comprising a polylactide.

11. The method of claim 1, the non-hydrolysable component comprising a polystyrene.

12. The method of claim 1, the non-hydrolysable component comprising the polymerization product of a styrene-containing monomer or a diene-containing monomer or combinations thereof.

13. The method of claim 1, wherein the multi-component polymer comprises a block copolymer that includes the hydrolysable component as a first block and the nonhydrolyzable component as a second block.

* * * * *